United States Patent
Feng et al.

(10) Patent No.: US 11,492,445 B2
(45) Date of Patent: Nov. 8, 2022

(54) DIRECT SYNTHESIS OF GLYCIDYL AZIDE POLYMERS

(71) Applicant: King Abdullah University of Science and Technology, Thuwal (SA)

(72) Inventors: Xiaoshuang Feng, Thuwal (SA); Senthil Boopathi, Thuwal (SA); Nikolaos Hadjichristidis, Thuwal (SA); Yves Gnanou, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 160 days.

(21) Appl. No.: 16/642,152

(22) PCT Filed: Aug. 27, 2018

(86) PCT No.: PCT/IB2018/056522
§ 371 (c)(1),
(2) Date: Feb. 26, 2020

(87) PCT Pub. No.: WO2019/043559
PCT Pub. Date: Mar. 7, 2019

(65) Prior Publication Data
US 2020/0362106 A1    Nov. 19, 2020

Related U.S. Application Data

(60) Provisional application No. 62/598,229, filed on Dec. 13, 2017, provisional application No. 62/551,849, filed on Aug. 30, 2017.

(51) Int. Cl.
*C08G 64/34* (2006.01)
*C08G 64/02* (2006.01)
(Continued)

(52) U.S. Cl.
CPC ......... *C08G 64/34* (2013.01); *C08G 64/0241* (2013.01); *C08G 65/10* (2013.01); *C08G 65/22* (2013.01)

(58) Field of Classification Search
None
See application file for complete search history.

(56) References Cited

U.S. PATENT DOCUMENTS

| | | |
|---|---|---|
| 3,645,917 A | 2/1972 | Vandenberg |
| 4,268,450 A | 5/1981 | Frankel et al. |

(Continued)

FOREIGN PATENT DOCUMENTS

| | | |
|---|---|---|
| EP | 0274213 B1 | 5/1992 |
| EP | 0646614 A1 | 4/1995 |
| PL | 180508 B1 * | 12/1995 |

OTHER PUBLICATIONS

Mohan et al., "Synthesis of azido polymers as potential energetic propellant binders," Design Monomers and Polymers, vol. 9, No. 3, pp. 201-236 (2006) (Year: 2006).*

(Continued)

*Primary Examiner* — Randy P Gulakowski
*Assistant Examiner* — Ha S Nguyen
(74) *Attorney, Agent, or Firm* — Billion & Armitage

(57) ABSTRACT

Embodiments of the present disclosure describe a method of synthesizing a glycidyl azide homopolymer comprising contacting a glycidyl azide monomer, an initiator, and a Lewis acid sufficient to form the glycidyl azide homopolymer; wherein the glycidyl azide homopolymer is directly polymerized from the glycidyl azide monomer. Embodiments of the present disclosure further describe a method of making a glycidyl azide polymer comprising contacting one or more of a glycidyl azide monomer, an epoxide monomer, carbon (Continued)

dioxide, an initiator, and a Lewis acid in a reaction medium to form a glycidyl azide polymer.

15 Claims, 19 Drawing Sheets

(51) Int. Cl.
  *C08G 65/10* (2006.01)
  *C08G 65/22* (2006.01)

(56) References Cited

U.S. PATENT DOCUMENTS

| | | | |
|---|---|---|---|
| 4,891,438 A | 1/1990 | Ahad | |
| 5,124,463 A | 6/1992 | Ampleman | |
| 5,214,110 A | 5/1993 | Ahad | |
| 5,892,067 A * | 4/1999 | Talukder | C08F 20/36 552/10 |

OTHER PUBLICATIONS

Gaur et al.,"Azido Polymers-Energetic Binders for Solid Rocket Propellants," Journal of Macromolecular Science, Part C—Polymer Reviews, vol. C43, No. 4, pp. 505-545, (2003) (Year: 2003).*
Search Report and Written Opinion for Application No. PCT/IB2018/056522 dated Oct. 29, 2018.
Frankel, et al., "Historical Development of Glycidyl Azide Polymer", Journal of Propulsion and Power, American Institute of Aeronaautics and Astronautics, New York, US, vol. 8, No. 3, May 1, 1992, 560-563.
Billouard , et al., ""Controlled" High-Speed Anionic Polymerization of Propylene Oxide Initiated by Alkali Metal Alkoxide/Trialkylaluminum Systems", Macromolecules, vol. 37, No. 11, 2004, pp. 4038-4043.
Brown, C. Herbert, et al., "Facile reaction of dialkylchloroboranes with organic azides. Remarkable enhancement of reactivity relative to trialkylboranes", Journal of the American Chemical Society 1972 94 (6), 2114-2115.
Brown , et al., "Organoboranes for Synthesis : 8. Reaction of Organoboranes with Representative Organic Azides. A General Stereospecific Synthesis of Secondary Amines and N-Substituted Azridines", Tetrahedron, vol. 43, No. 18, 1987, pp. 4079-4088.
Carlotti, et al., "Living/Controlled Anionic Polymerization and Copolymerization of Epichlorohydrin with Tetraoctylammonium Bromide—Triisobutylaluminum Initiating Systems", Macromolecules, vol. 41, No. 19, 2008, pp. 7058-7062.
Eroglu , et al., "Spectroscopic and Thermal Characterization of Poly(glycidylazide) Converted from Polyepichlorohydrin", Journal of Applied Polymer Science, vol. 60, 1996, pp. 1361-1367.
Gervais , et al., "Direct Synthesis of α-Azido,ω-hydroxypolyethers by Monomer-Activated Anionic Polymerization", Macromolecules, vol. 42, No. 7, 2009, pp. 2395-2400.
Gervais , et al., "Synthesis of Linear High Molar Mass Glycidol-Based Polymers by Monomer-Activated Anionic Polymerization", Macromolecules, vol. 43, No. 4, 2010, pp. 1778-1784.
Labbe , et al., "Controlled High-Speed Anionic Polymerization of Propylene Oxide Initiated by Onium Salts in the Presence of Triisobutylaluminum", Macromolecules, vol. 40, No. 22, 2007, pp. 7842-7847.
Laviolette , et al., "Monitoring the Aging Dynamics of Glycidyl Azide Polyurethane by NMR Relaxation Times", Macromolecules, vol. 32, 1999, pp. 1602-1610.
Murali Mohan , et al., "Synthesis and Characterization of Glycidyl Azide Polymer with Enhanced Azide Content", International Journal of Polymeric Materials, vol. 55, 2006, pp. 441-455.
Xu , et al., "Synthesis of Glycidyl Azide Polymers (GAPs) via Binary Ionic Liquid-Water Mixtures Without Catalysts", Green Chemistry, vol. 18, 2016, pp. 1-5.

* cited by examiner

Table 1: Triethyl borane-assisted homopolymerization of glycidyl azide[a].

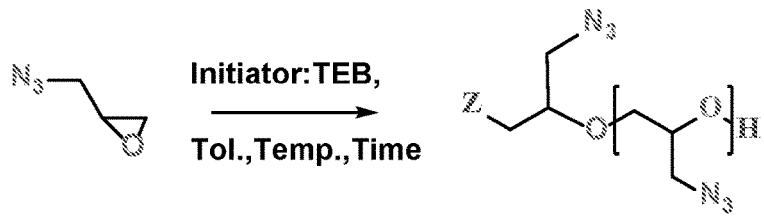

| Entry | Initiator | [M]:[I]:[A] | Time (h) | Temp °C | Conv (%)[b] | Mn x $10^3$ (Theo)[c] | GPC[d] Mn x $10^3$/PDI |
|---|---|---|---|---|---|---|---|
| 1 | Bu$_4$NBr | 50:1:3 | 68 | 0 | 86 | 4.3 | 3.6/1.2 |
| 2 | Bu$_4$NBr | 50:1:3 | 40 | -10 | 79 | 3.9 | 3.8/1.15 |
| 3 | Bu$_4$NCl | 100:1:5 | 20 | 0 | 61 | 6.0 | 3.8/1.2 |
| 4 | Bu4NN3 | 100:1:3 | 20 | 0 | 39 | 3.8 | 0.3/1.6 |
| 5 | PPNCl | 100:1:3 | 20 | 0 | 55 | 5.4 | 3.8/1.2 |
| 6 | Bu$_4$PCl | 100:1:3 | 20 | 0 | 46 | 4.5 | 3.6/1.2 |
| 7 | (Oct)$_4$NBr | 50:1:3 | 20 | 0 | 98 | 4.9 | 4.6/1.1 |
| 8 | (Oct)$_4$NBr | 100:1:3 | 20 | 0 | 75 | 7.5 | 5.7/1.2 |
| 9 | (Oct)$_4$NBr | 100:1:5 | 22 | 0 | 74 | 7.4 | 5.7/1.1 |
| 10[e] | (Oct)$_4$NBr | 100:1:5 | 45 | 0 | 86 | 8.5 | 8.0/1.1 |
| 11 | (Oct)$_4$NBr | 100:1:5 | 45 | 0 | 93 | 9.2 | 8.6/1.1 |
| 12 | (Oct)$_4$NBr | 200:1:5 | 68 | 0 | 49 | 9.7 | 7.0/1.1 |
| 13 | (Oct)$_4$NBr | 100:0.5:5 | 45 | 0 | 79 | 16 | 10.0/1.1 |
| 14 | (Oct)$_4$NBr | 100:0.38:5 | 72 | 0 | 73 | 22 | 11.2/1.2 |
| 15[f] | ROH-P$_4$ | 100:1:3 | 22 | 0 | 47 | 4.6 | 4.1/1.1 |
| 16[g] | HOROH-P$_4$ | 100:1:5 | 22 | 0 | 50 | 9.9 | 11.8/1.1 |
| 17 | Bu$_4$NCO$_2$H | 25:1:5 | 15 | 0 | 90 | 2.2 | 1.7/1.1 |
| 18 | Bu$_4$NCO$_2$H | 50:1:5 | 15 | 0 | 69 | 3.4 | 2.6/1.1 |
| 19[h] | (Oct4N)$_2$-ADP | 100:1:15 | 14 | 0 | 78 | 7.8 | 3.0/1.3 |
| 20[i] | (Oct4N)$_3$-TCA | 100:1:15 | 14 | 0 | 88 | 8.8 | 3.2/1.4 |

[a] All polymerizations were carried out in 20 mL glass schlenk tube with rotaflo stopcocks under argon atm; [b] determined from $^1$H NMR; [c] Calculated based on the formula: Mn(theo) = 99 (DPtarget) × (conversion %). [d] Determined by GPC in THF with polystyrene standard; [e] Reaction was done using toluene as solvent, Ratio of monomer:solvent = 3:1; [f] ROH = monomethyl diethylene glycol; [g] HOROH = Triethylene glycol; [h] (Oct$_4$N)$_2$-ADP = ditetraocylammonium adipate; [i] (Oct$_4$N)$_3$-TCA = tetraocylammonium tricarballylate.

*FIG. 17*

Table 2: Triethyl borane-assisted copolymerization of glycidyl azide and carbon dioixde[a].

| Entry | Initiator | Activator | [M]:[I]:[A] | Temp (°C) | Time (h) | Selectivity[b] Cyclic | Selectivity[b] Linear | PC (%)[c] | Yield (%)[d] | Mnx10³ (Theo)[e] | GPC[f] Mnx10³/PDI |
|---|---|---|---|---|---|---|---|---|---|---|---|
| 1 | ROH-P4 | TEB | 100:1:2 | 10 | 14 | - | >99 | >99 | 34 | 4.8 | 4.1/1.2 |
| 2 | BuLi-P4 | TEB | 100:1:2 | 25 | 14 | >99 | - | - | (23)[g] | - | - |
| 3 | PPNCl | TEB | 100:1:2 | 25 | 14 | 50 | 50 | >99 | (83)[g] | - | 2.4/1.2 |
| 4 | Bu₄NCl | TEB | 100:1:2 | 25 | 14 | 10 | 90 | >99 | 79 | 11.3 | 6.5/1.1 |
| 5 | Bu₄NN₃ | TEB | 100:1:5 | 25 | 14 | - | >99 | >99 | 94 | 14.3 | 4.6/1.2 |
| 6 | Bu₄NN₃ | TEB | 100:1:2 | 25 | 14 | - | >99 | >99 | 68 | 9.7 | 6.7/1.1 |
| 7 | Bu₄NN₃ | TEB | 100:1:1.25 | 25 | 14 | 7 | 93 | >99 | 63 | 9.0 | 8.2/1.1 |
| 8 | Bu₄NN₃ | TEB | 100:1:0.5 | 25 | 14 | >99 | - | - | (>99)[g] | - | - |
| 9 | Bu₄NN₃ | TEB | 50:1:1 | 25 | 14 | - | >99 | >99 | 91 | 6.5 | 5.0/1.2 |
| 10 | Bu₄NN₃ | TEB | 100:1:1.25 | 10 | 14 | 24 | 76 | >99 | (43)[g] | - | 2.3/1.2 |
| 11 | Bu₄NN₃ | TEB | 100:1:1.25 | -5 | 48 | 9 | 91 | >99 | 29 | 4.0 | 2.70/1.2 |
| 12 | Bu₄NN₃ | TEB | 100:1:1.25 | -10 | 70 | 5 | 95 | >99 | (28)[g] | - | 1.80/1.3 |
| 13 | Bu₄NN₃ | TEB | 100:1:1.25 | -15 | 72 | - | >99 | >99 | (12)[g] | - | 0.7/1.3 |
| 14 | Bu₄NN₃ | TEB | 100:1:2 | -5 | 65 | 2 | 98 | >99 | 61 | 8.5 | 5.2/1.2 |
| 15 | Bu₄NN₃ | TEB | 100:1:1.5 | -5 | 120 | 6 | 94 | >99 | 60 | 8.7 | 7.0/1.1 |
| 16 | Bu₄NN₃ | TEB | 50:1:1 | -5 | 65 | 2 | 98 | >99 | 60 | 4.4 | 3.3/1.2 |
| 17 | Bu₄NCOOH | TEB | 50:1:2 | 25 | 16 | 2 | 98 | >99 | 79 | 5.7 | 4.4/1.2 |
| 18[h] | (Oct₄N)₃TCA | TEB | 100:1:6 | 10 | 16 | 7 | 93 | >99 | 81 | 11.4 | 3.2/1.3 |

[a]All polymerizations were carried out in 50 mL autoclaves under 20 atm of $CO_2$; [b] Calculated from IR spectra; [c] determined from $^1$H NMR; [d] Calculated by gravimetry; [e] Calculated based on the formula: Mn(theo) = 143 (DPtarget) × (yield%). [f] Determined by GPC in THF with polystyrene standard; [g] Values in the parenthesis corresponds to conversion determined from $^1$H NMR; ROH = monomethyl diethylene glycol. [h](Oct₄N)₃-TCA = Tetraoctylammonium tricarballylate

*FIG. 18*

Table 3: Random copolymerization of glycidyl azide (GA) with CHO, PO, and $CO_2$[a].

| Entry | Monomer | Initiator [I] | [I]:[A] | T (°C) | Ratio of Monomer | Targeted DP | Sele. (%)[b] | PC (%)[c] | Yield (%)[d] | Mnx10³ (Theo)[e] | GPC[f] Mnx10³ /PDI |
|---|---|---|---|---|---|---|---|---|---|---|---|
| 1 | GA:CHO | Bu₄NN₃ | 1:1 | 25 | 1:4 | 100 | >99 | >99 | 63 | 9.0 | 6.2/1.1 |
| 2 | GA:PO | Bu₄NN₃ | 1:1 | 25 | 1:4 | 100 | >99 | >99 | 41 | 4.5 | 6.0/1.1 |
| 3 | GA:PO | (Oct)₄NBr | 1:5 | 0 | 1:9 | 100 | - | - | (>98)[g] | 6.4 | 11.5/1.2 |

[a]Random polycarbonate (entry 1,2) were carried out in 50 mL autoclaves under 20 atm of CO2; Random polyether synthesis was carried out in 20 mL glass schlenk tube with rotaflo stopcocks under argon atm [b] Selectivity (Linear vs cyclic carbonate) calculated from IR spectra; [c] Polycarbonate content (PC) determined from ¹H NMR; [d] Calculated by gravimetry; [e] Calculated based on the formula: Mn(theo) = 143 (DPtarget) × (yield%). [f] Determined by GPC in THF with polystyrene standard; [g] Values in the parenthesis corresponds to conversion determined from ¹H NMR

*FIG. 19*

DIRECT SYNTHESIS OF GLYCIDYL AZIDE POLYMERS

BACKGROUND

The glycidyl azide polymer (GAP) is an energetic, thermally stable, insensitive polymer exhibiting good compatibility with high energetic oxidizers and thus has potential applications in advanced solid propellants, such as (a) non-detonable minimum smoke propellants, (b) clean propellants for solid rocket boosters, (c) gas generators/aircraft starter cartridges, etc. The high energy content of this polymer is due to the pendant azido group which contributes to a positive heat of formation of 75 to 95 kcal/unit. In particular, low molecular weight glycidyl azide polymer ($M_w$=2000 for binder, 500 for plasticizer) with two terminated hydroxyls is an important candidate as polymeric binder for energetic propellant, after the terminal hydroxyls of GAP were cured with —NCO groups of isocyanates. The energetic properties of GAP are due to the chain scission of azido group, which gives a heat of reaction of +957 kJ/kg.

GAP was first synthesized through the substitution reaction of prepolymer poly(epichlorohydrin) triol (PECH-triol) with sodium azide. Later, modifications and advancement in the synthesis of GAP were achieved, including the synthesis of diazido terminated glycidyl azide energetic plasticizer and hydroxyl terminated aliphatic polyethers having pendant alkyl azide groups [(—$CH_2$)$_n$$N_3$]. Additionally, low molecular weight (M.Wt=350) hydroxyl terminated GAP was prepared directly from epichlorohydrin under thermal conditions. Recently, GAP was synthesized by the azidation of PECH by various greener routes such as azidation in aqueous media, use of phase transfer catalyst or ionic liquids to enhance the rate.

Even though there are many methods available for the GAP synthesis, each has certain limitations. For instance, azidation of PECH requires harsh conditions (>90° C.) which results in loss of tacticity in the polymer, non-completion azidation, use of toxic organic solvents such as DMF, DMSO and introduction of impurities. Presently known methods of GAP synthesis reported to date depend on the post polymerization of PECH using sodium azide. In addition, there is no report of synthesis of GAP through direct polymerization of glycidyl azide, which may be due to the sensitivity of pendant azido functionality towards Lewis acids.

SUMMARY

In general, embodiments of the present disclosure describe methods of synthesizing glycidyl azide polymers.

Accordingly, embodiments of the present disclosure describe a method of synthesizing a glycidyl azide homopolymer comprising contacting a glycidyl azide monomer, an initiator, and a Lewis acid sufficient to form the glycidyl azide homopolymer; wherein the glycidyl azide homopolymer is directly polymerized from the glycidyl azide monomer.

Embodiments of the present disclosure further describe a method of making a glycidyl azide polymer comprising contacting one or more of a glycidyl azide monomer, an epoxide monomer, an initiator, and a Lewis acid in a reaction medium to form a glycidyl azide polymer. In an embodiment, the method further comprises optionally charging the reaction medium with carbon dioxide.

In an embodiment of the present disclosure, the method of making a glycidyl azide polymer comprises contacting a glycidyl azide monomer, an initiator, and a Lewis acid in a reaction medium, and charging the reaction medium with carbon dioxide to form a glycidyl azide polycarbonate.

In an embodiment of the present disclosure, the method of making a glycidyl azide polymer comprises contacting a glycidyl azide monomer, an initiator, a Lewis acid, and an epoxide monomer in a reaction medium to form a glycidyl azide random polyether copolymer.

In an embodiment of the present disclosure, the method of making a glycidyl azide polymer comprises contacting a glycidyl azide monomer, an epoxide monomer, and an initiator, and a Lewis acid in a reaction medium, and charging the reaction medium with carbon dioxide to form a glycidyl azide random polycarbonate copolymer.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIG. 17 shows TABLE 1 providing results triethyl borane-assisted homopolymerization of glycidyl azide[a]. [a]All polymerizations were carried out in 20 mL glass schlenk tube with rotaflo stopcocks under argon atm; [b]determined from $^1$H NMR; [c]Calculated based on the formula: Mn(theo)=99 (DPtarget)×(conversion %); [d]Determined by GPC in THF with polystyrene standard; [e]Reaction was done using toluene as solvent. Ratio of monomer:solvent= 3:1; [f]ROH=monomethyl diethylene glycol; [g]HOROH=Triethylene glycol; [h]($Oct_4N)_2$— ADP=ditetraocylammonium adipate; [i]($Oct_4N)_3$— TCA=tetraocylammonium tricarballylate.

FIG. 18 shows TABLE 2 providing results of triethyl borane-assisted copolymerization of glycidyl azide and carbon dioxide. [a]All polymerizations were carried out in 50 mL autoclaves under 20 atm of $CO_2$; [b]Calculated from IR spectra; [c]determined from $^1$H NMR; [d]Calculated by gravimetry; [e]Calculated based on the formula: Mn(theo)=143 (DPtarget)×(yield %); [f]Determined by GPC in THF with polystyrene standard; [g]Values in the parentheses correspond to conversion determined from $^1$H NMR: ROH=monomethyl diethylene glycol; [h]($Oct_4N)_3$— TCA=Tetraoctylammonium tricarballylate.

FIG. 19 shows TABLE 3 providing results of random copolymerization of glycidyl azide (GA) with CHO, PO, and $CO_2$[a]. [a]Random polycarbonate (entry 1,2) were carried out in 50 mL autoclaves under 20 atm of $CO_2$; Random polyether synthesis was carried out in 20 mL glass schlenk tube with rotaflo stopcocks under argon atm; [b]Selectivity (Linear vs cyclic carbonate) calculated from IR spectra; Polycarbonate content (PC) determined from 1H NMR; [d]Calculated by gravimetry; 'Calculated based on the formula: Mn(theo)=143 (DPtarget)×(yield %); [f]Determined by GPC in THF with polystyrene standard; [g]Values in the parenthesis corresponds to conversion determined from $^1$H NMR.

DETAILED DESCRIPTION

Figure 1:
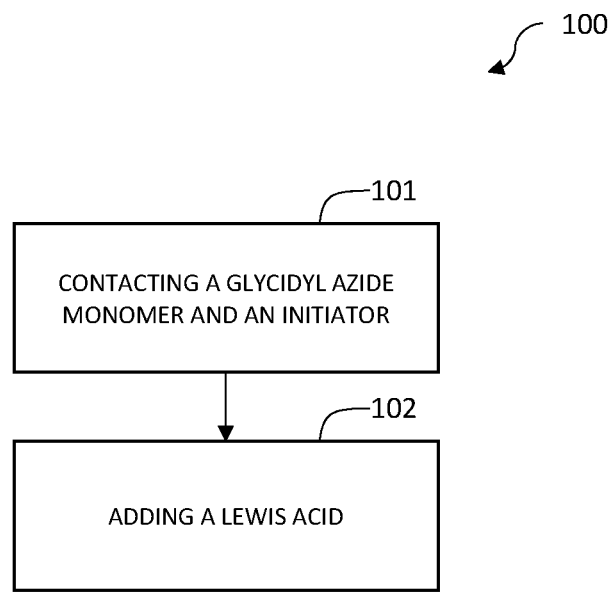
FIG. 1 is a method of synthesizing a glycidyl azide homopolymer, according to one or more embodiments of the present disclosure.

The invention of the present disclosure relates to the synthesis of glycidyl azide polymers. In particular, the invention of the present disclosure relates to the direct polymerization of glycidyl azide monomers to form a variety of glycidyl azide polymers. The synthesis of glycidyl azide polymers may be carried out through anionic ring opening polymerization using an initiator and/or in the presence of a mild Lewis acid. In many embodiments, glycidyl azide monomers may be directly polymerized to form poly(glycidyl azide), a glycidyl azide homopolymer, which may be used, for example, as a propellant binder. In other embodiments, glycidyl azide monomers may be directly polymerized to form a variety of copolymers and terpolymers. For example, glycidyl azide monomers may be copolymerized with carbon dioxide and/or epoxide monomers to form one or more of glycidyl azide polycarbonate, glycidyl azide random polyether copolymer, and glycidyl azide random polycarbonate copolymer.

As mentioned above, the present invention is based on a pioneering discovery that glycidyl azide may be directly polymerized though anionic ring opening polymerization using a mild Lewis acid, such as triethyl borane (TEB). This method ensures the synthesis of poly(glycidyl azide) in a controlled manner to obtain GAP in the range of 1,000 to 20,000 g/mol with 100% azide content. Moreover, this strategy was successfully extended for the unprecedented synthesis of corresponding glycidyl azide polycarbonate (Scheme 1). Low molecular weight hydroxyl terminated GAP-diols (1000-2500) synthesized can be used as precursors to make polyurethanes, and the pendent azide group can be further derivatized through "click" reaction or easily modified into primary amines.

Scheme 1 is an example of an embodiment in which triethyl borane is used to catalyze the controlled anionic polymerization of glycidyl azide, according to one or more embodiments of the present disclosure.

Scheme 1

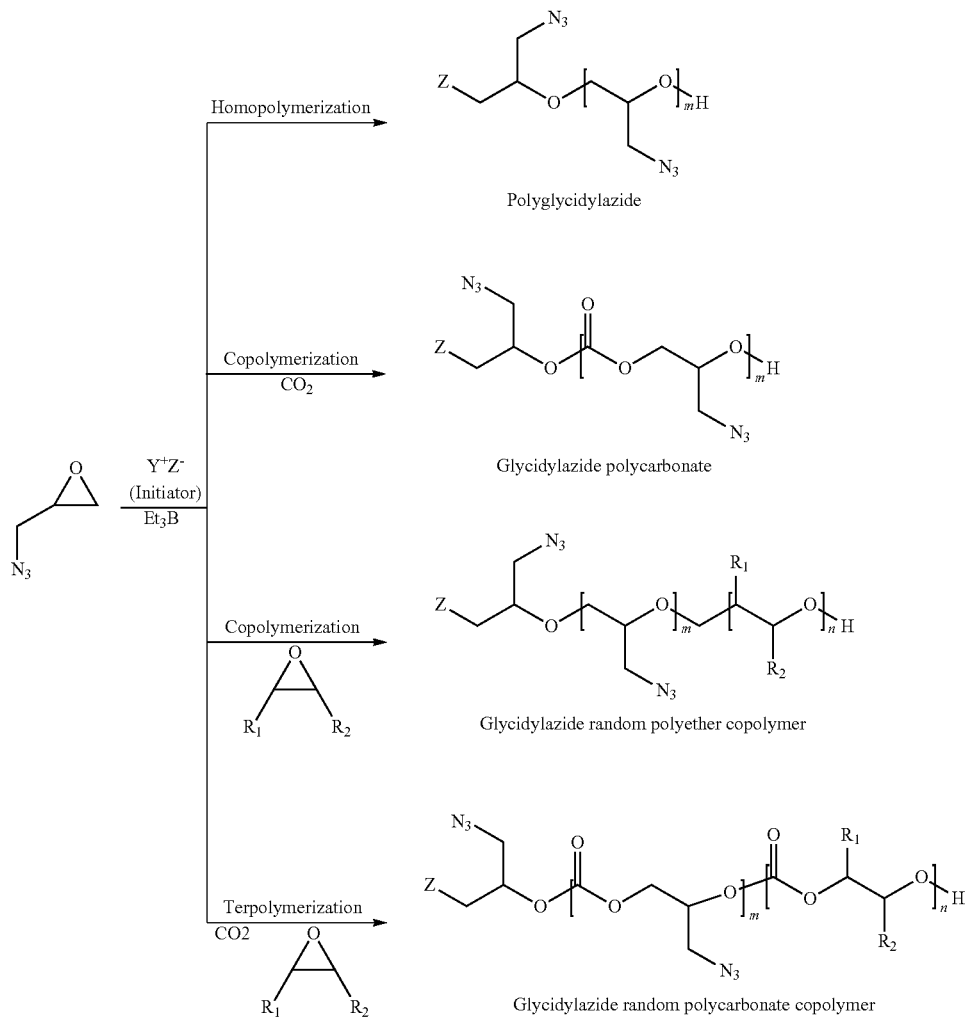

$Z^-$ (anions): $Cl^-$, $Br^-$, $N_3^-$, $RO^-$ or $ROCO_2^-$
$Y^+$ (cations): $t\text{-}BuP_4H^+$, $NBu_4^+$, $PPN^+$, $PPh_4^+$, $PBu_4^+$
Structure of cations:

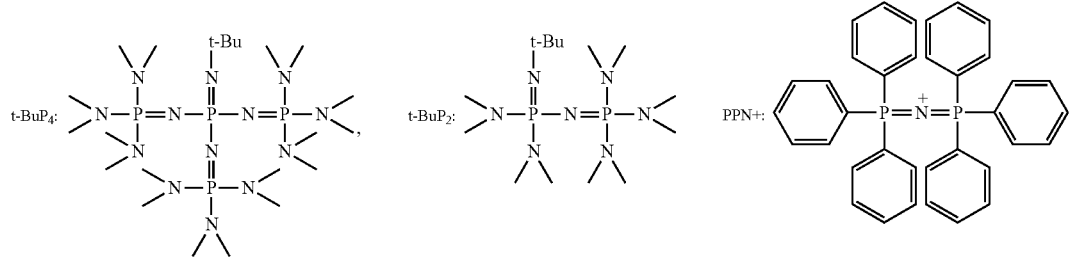

Scheme 1 and various other embodiments are described in greater detail elsewhere herein. The embodiments of Scheme 1 are illustrative and shall not be limiting.

Definitions

The terms recited below have been defined as described below. All other terms and phrases in this disclosure shall be construed according to their ordinary meaning as understood by one of skill in the art.

As used herein, "adding" refers to any process and/or method of placing one component in or on another component, joining one or more components with another component, and/or bringing two or more components together, as in contacting. The components may be in contact or in immediate/close proximity. Adding may include one or more of pouring, dumping, mixing, depositing, providing, placing, putting, inserting, injecting, introducing, dropping, contacting, and any other methods known in the art.

As used herein, "charging" refers to any process and/or method of feeding carbon dioxide to the reaction medium.

Accordingly, charging may include one or more of flowing, passing, injecting, pumping, introducing, providing, and any other methods known in the art.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Mixing is an example of contacting.

FIG. 1 is a flowchart of a method 100 of synthesizing a glycidyl azide homopolymer, according to one or more embodiments of the present disclosure. The method 100 comprises contacting 101 a glycidyl azide monomer, an initiator, and a Lewis acid to form the glycidyl azide homopolymer. In many embodiments, the glycidyl azide homopolymer is directly polymerized from the glycidyl azide monomer. The method 100 is for the first time the glycidyl azide homopolymer (e.g., poly(glycidyl azide)) may be directly polymerized from the glycidyl azide monomer. In many embodiments, the direct synthesis of the glycidyl azide homopolymer is through anionic ring-opening polymerization of the glycidyl azide monomer using a mild Lewis acid and an initiator.

At step 101, the glycidyl azide monomer, initiator, and Lewis acid are contacted. Contacting may generally refer to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Dissolving, mixing, stirring, etc., and combinations thereof are examples of forms of contacting. Contacting of the glycidyl azide monomer, initiator, and/or Lewis acid may occur contemporaneously or simultaneously, or sequentially, in any order. Contacting may further include contacting at select reaction conditions (e.g., temperature, pressure, etc.). In an embodiment, the contacting may include dissolving the initiator in the glycidyl azide monomer to form a monomer solution. The monomer solution may optionally be stirred at a selected temperature for a selected period of time, before adding the Lewis acid to the monomer solution to form the glycidyl azide homopolymer.

The glycidyl azide monomer generally includes at least a glycidyl group and an azide group. The glycidyl group may generally be described as a compound including an epoxy ring bridged to a carbon atom of an organic group. The azide group may generally be characterized as $N_3$. In many embodiments, the glycidyl azide monomer may be characterized by the following chemical structure:

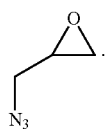

The initiator may include an organic cation associated with one or more of a halide, pseudohalide, alkoxide, phenoxide, carboxylate, carbonate, hydrogen carbonate, etc. In an embodiment, the initiator may be characterized by the formula: $Y^+Z^-$. In an embodiment, $Y^+$ is an organic cation, such as onium salts including any alkyl group. For example, $Y^+$ may include one or more of an ammonium cation, phosphonium cation, and phosphazenium cation, each of which may include any alkyl group. In an embodiment, $Y^+$ may include one or more of t-$BuP_4H^+$, $NBu_4^+$, $PPN^+$, $PBu_4^+$, $PPh_4^+$, and $(Oct)_4N^+$. In an embodiment, $Z^-$ is any halide, pseudohalide, alkoxide, phenoxide, carboxylate, carbonate, hydrogen carbonate, etc. For example, $Z^-$ may include one or more of $Cl^-$, $Br^-$, $N_3^-$, $RO^-$, $ROCO_2^-$, and $RCO_2^-$, etc. In many embodiments, the initiator may include one or more of $Bu_4NBr$, $Bu_4NCl$, $Bu_4NN_3$, $PPNCl$, $Bu_4PCl$, $(Oct)_4NBr$, $ROH—P_4$, $HOROH—P_4$, $Bu_4NCO_2H$, $(Oct)_4NCO_2H$, $BuLi-P_4$, and multifunctional initiators $R—(CO_2^-)_n$ $[(Oct)_4N^+]_n$, $R—(CO_2^-)_n[(Oct)_4N^+]_n$.

The Lewis acid may include one or more of boron and aluminum compounds. For example, the Lewis acid may include one or more of an alkyl borane and alkyl aluminum. In embodiments in which the Lewis acid includes an alkyl borane, the Lewis acid may include a trialkyl borane. For example, trialkyl boranes may include one or more of triethyl borane, trimethyl borane, triisobutylborane, tri-n-butylborane and triphenyl borane. In embodiments in which the Lewis acid includes an alkyl aluminum, the Lewis acid may include a trialkyl aluminum. For example, the trialkyl aluminum may include triisobutyl aluminum. In a preferred embodiment, the Lewis acid is triethyl borane.

The glycidyl azide homopolymer, or poly(glycidyl azide), may be directly synthesized via anionic ring opening polymerization of glycidyl azide (e.g., glycidyl azide monomer). This is contrary to conventional knowledge, which teaches away from the present disclosure for at least two reasons. First, glycidyl azicde could conventionally only be polymerized via cationic polymerization using an acid, but cationic polyermization is not sufficiently reactive and thus fails. In addition, conventional knowledge is that anionic polymerization of glycidyl azide fails due to the sensitivity of pendant azido functionality towards Lewis acids. In other words, the azido group deactivates Lewis acids. Accordingly, to overcome these challenges, the present invention provides that the direct polymerization of glycidyl azide occurs in the presence of the initiator and an excess of the milder Lewis acid. The initiator and Lewis acid mix/associate in such a way that an anion of the initiator and a stoichiometric amount of the Lewis acid form an ate complex, which is less reactive and more selective than the anion. In addition, it can be important for the Lewis acid to be provided in excess of stoichiometric conditions. The excess of Lewis acid serves to activate the monomer (e.g., make it more reactive towards anionic attack). In an embodiment, the ratio of initiator to Lewis acid may range from about 1:1 to about 1:10. In a preferred embodiment, the ratio of initiator to Lewis acid is at least about 1:2. In this way, the invention of the present disclosure provides, for the first time, a method of directly polymerizing glycidyl azide monomer to form glycidyl azide homopolymer.

Figure 2:
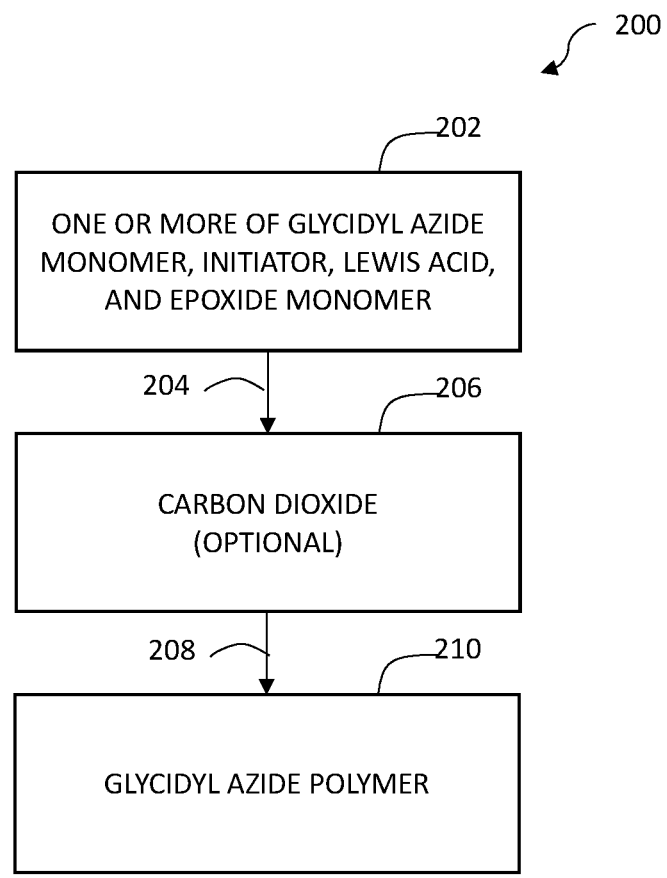
FIG. 2 is a method of synthesizing a glycidyl azide polymer, according to one or more embodiments of the present disclosure.

FIG. 2 is a method 200 of synthesizing a glycidyl azide polymer (GAP) 210, according to one or more embodiments of the present disclosure. The method 200 comprises contacting 204 one or more of a glycidyl azide monomer, an epoxide monomer, an initiator, and a Lewis acid in a reaction medium 202 to form a glycidyl azide polymer 210. In an embodiment, the method may optionally further comprise charging 208 the reaction medium with carbon dioxide 206. The glycidyl azide monomer, initiator, and Lewis acid may include any of the various forms and/or embodiments described herein. In many embodiments, the method 200 may be used to form glycidyl azide copolymers and terpolymers, among other types of polymers.

Contacting may be as described elsewhere herein. For example, contacting of one or more of the glycidyl azide monomer, epoxide monomer, carbon dioxide, initiator, and Lewis acid may occur contemporaneously or simultaneously, or sequentially, in any order. In an embodiment, the initiator may be dissolved in the glycidyl azide monomer to form a monomer solution in a reaction medium. The monomer solution may optionally be stirred at a selected temperature for a selected period of time, before adding the Lewis acid to the monomer solution and charging the reaction medium with carbon dioxide. In an embodiment, the initiator may be dissolved in the glycidyl azide monomer and epoxide monomer to form a monomer solution in a reaction medium. The monomer solution may optionally be stirred at a selected temperature for a selected period of time, before adding the Lewis acid to the monomer solution. In an embodiment, the initiator may be dissolved in the glycidyl azide monomer and epoxide monomer to form a monomer solution in a reaction medium. The monomer solution may optionally be stirred at a selected temperature for a selected period of time, before adding the Lewis acid to the monomer solution and charging the reaction medium with carbon dioxide.

The terpolymerized epoxide monomer with glycidyl azide may be characterized by the following formula:

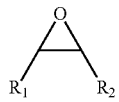

where each of $R_1$ and $R_2$ may be independently one or more of alkyl group or containing functional groups such as one or more of halide, vinyl, thiol, ether, ester, ketone, aldehyde, and acid. In addition or in the alternative, each of $R_1$ and $R_2$ may be independently one or more of any alkyl group including saturated and unsaturated, aromatic, cyclic alkyl group, heteroatom (e.g., halide, O, S, etc.) containing alkyl groups. In many embodiments, the epoxide monomer is one or more of ethylene oxide, propylene oxide, 1-butene oxide, 1-hexene oxide, 1-octene oxide, styrene oxide, cyclohexene oxide, allyl glycidyl ether, and butyl glycidyl ether.

In embodiments including carbon dioxide, the carbon dioxide may be contacted, added, and/or charged to the reaction medium. Contacting is described elsewhere herein. Adding may include any process and/or method of placing one component in or on another component, joining one or more components with another component, and/or bringing two or more components together, as in contacting. The components may be in contact or in immediate/close proximity. Adding may include one or more of pouring, dumping, mixing, depositing, providing, placing, putting, inserting, injecting, introducing, dropping, contacting, and any other methods known in the art. Charging may include any process and/or method of feeding carbon dioxide to the reaction medium. Accordingly, charging may include one or more of flowing, passing, injecting, pumping, introducing, providing, and any other methods known in the art.

The glycidyl azide polymer formed via the method 200 may be a copolymer formed from the glycidyl azide monomer and either the epoxide monomer or carbon dioxide, or both. For example, in an embodiment, the glycidyl azide polymer is a glycidyl azide random polyether copolymer formed from the copolymerization of the glycidyl azide monomer and epoxide monomer. The glycidyl azide random polyether copolymer may be characterized by the following formula:

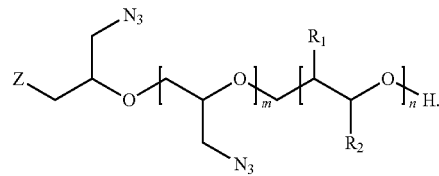

In an embodiment, the glycidyl azide polymer is a glycidyl azide polycarbonate formed from the copolymerization of the glycidyl azide monomer and carbon dioxide. The glycidyl azide copolymer may be characterized by the following formula:

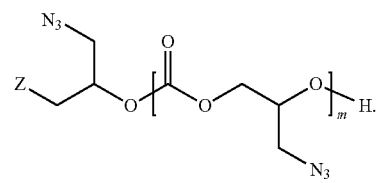

In an embodiment, the glycidyl azide copolymer is a glycidyl azide random polycarbonate copolymer formed from the terpolymerization of glycidyl azide monomer, epoxide monomer, and carbon dioxide. The glycidyl azide copolymer may be characterized by the following formula:

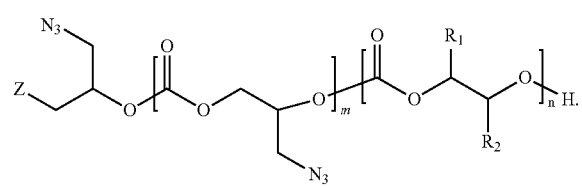

Figure 3:
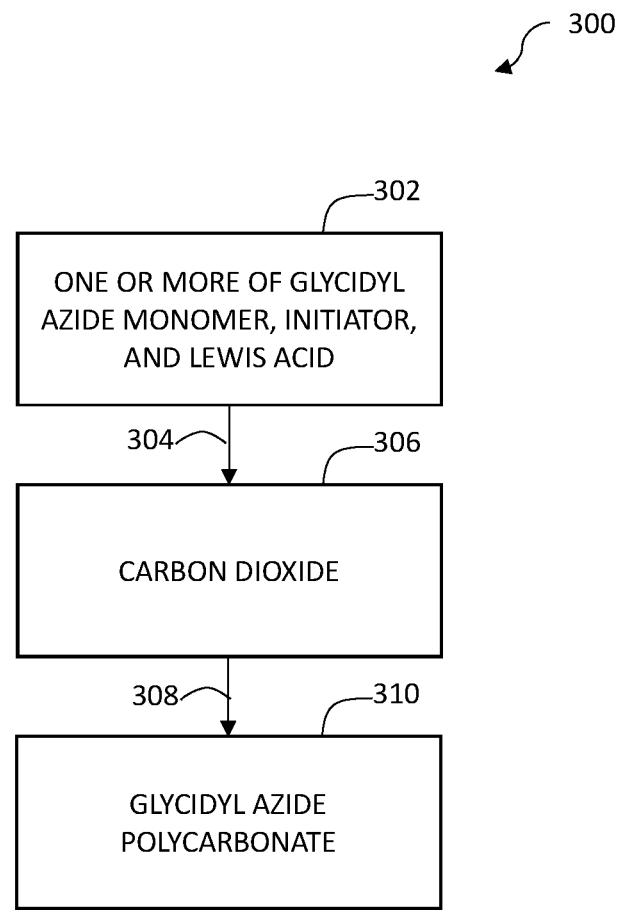
FIG. 3 is a method of synthesizing a glycidyl azide polycarbonate, according to one or more embodiments of the present disclosure.

FIG. 3 is a method 300 of synthesizing a glycidyl azide polycarbonate 310, according to one or more embodiments of the present disclosure. The method 300 comprises contacting 304 a glycidyl azide monomer, an initiator, and a Lewis acid in a reaction medium 302, and charging 308 the reaction medium with $CO_2$ 306 to form a glycidyl azide polycarbonate 310. In an embodiment, the glycidyl azide polycarbonate 310 is formed from the copolymerization of the glycidyl azide monomer and carbon dioxide. The glycidyl azide copolymer may be characterized by the following formula:

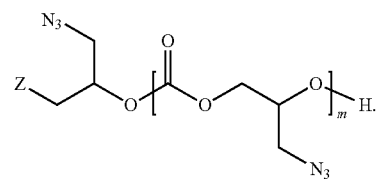

Figure 4:
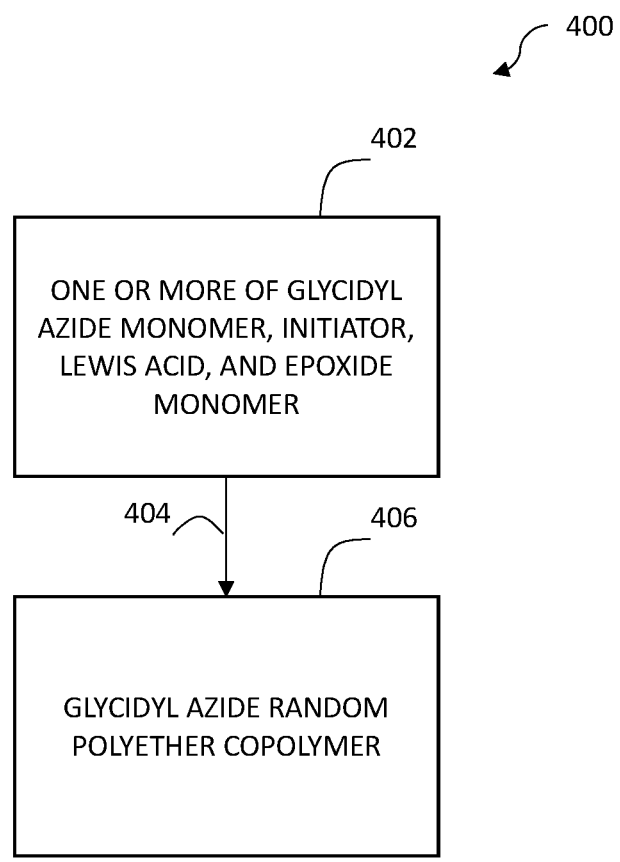
FIG. 4 is a method of synthesizing a glycidyl azide random polyether copolymer, according to one or more embodiments of the present disclosure.

FIG. 4 is a method 400 of synthesizing a glycidyl azide random polyether copolymer 406, according to one or more embodiments of the present disclosure. The method 400 comprises contacting 404 a glycidyl azide monomer, an initiator, a Lewis acid, and an epoxide monomer in a reaction medium 402 to form a glycidyl azide random polyether copolymer 406. In an embodiment, the glycidyl azide random polyether copolymer is formed from the copolymerization of the glycidyl azide monomer and epoxide monomer. The glycidyl azide random polyether copolymer may be characterized by the following formula:

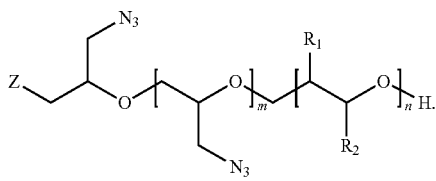

Figure 5:
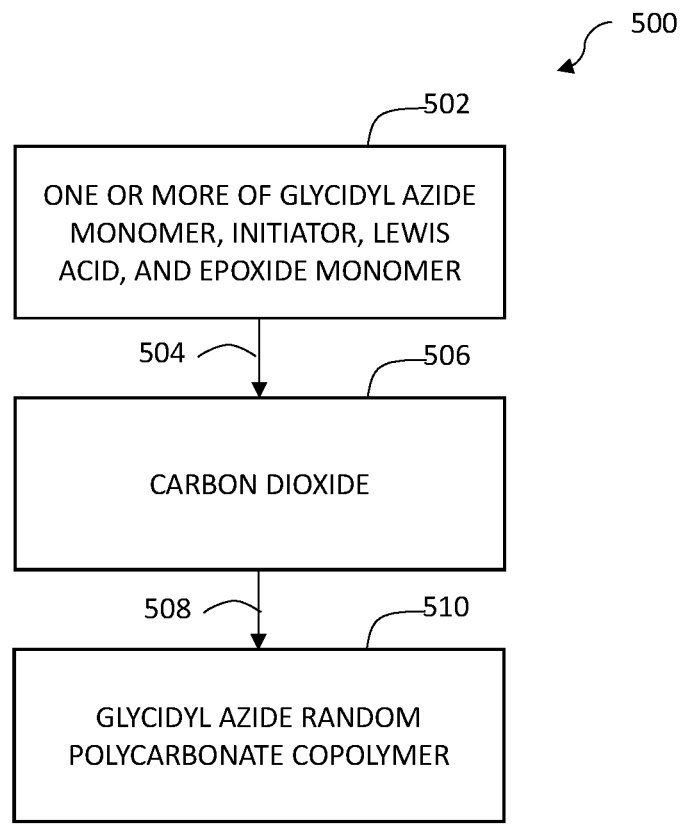
FIG. 5 is a method of synthesizing a glycidyl azide random polycarbonate copolymer, according to one or more embodiments of the present disclosure.
Figure 6:
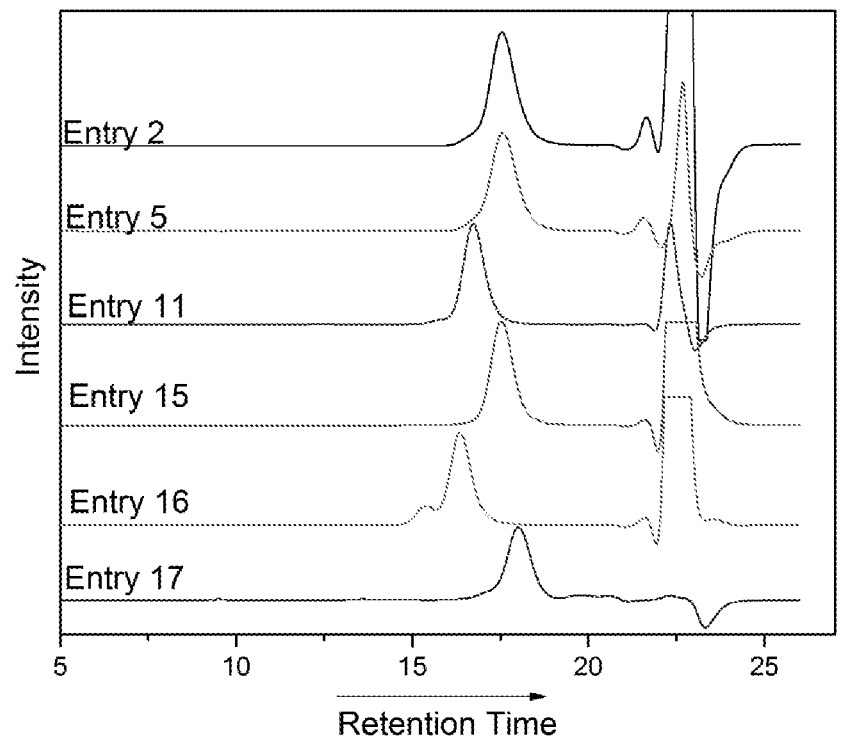
FIG. 6 is a graphical view of representative GPC traces of poly(glycidyl azide) from Table 1, according to one or more embodiments of the present disclosure.
Figure 7:
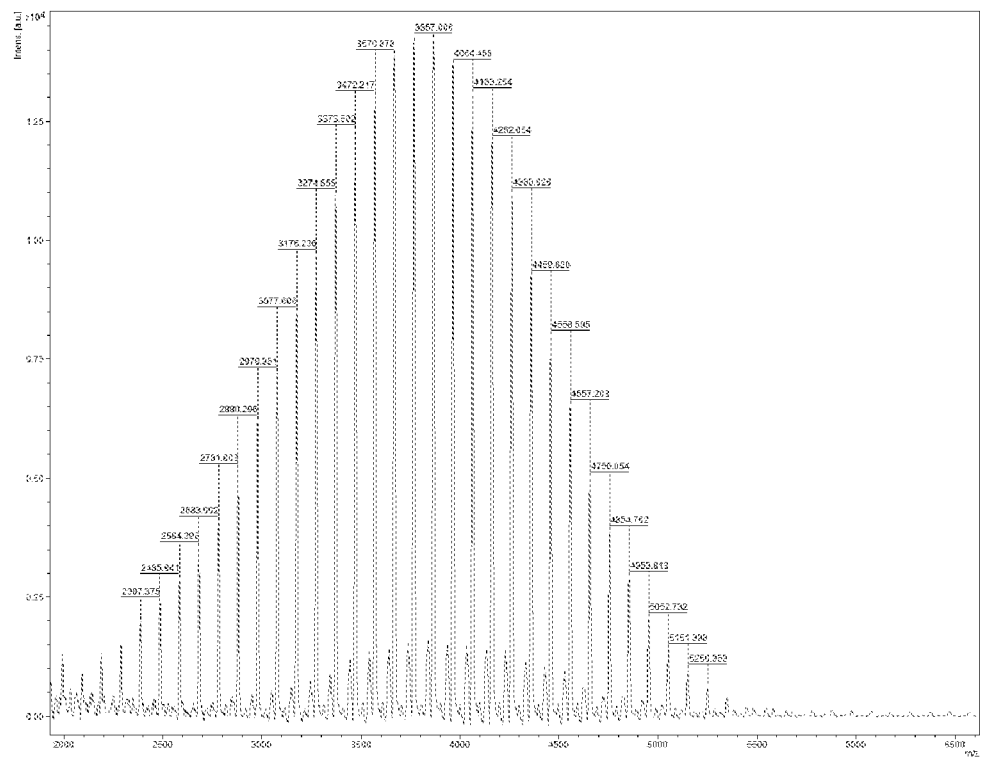
FIG. 7 is a graphical view of representative MALDI-TOF data of poly(glycidyl azide) from Table 1, Entry 2 ($Bu_4NBr$ as initiator), according to one or more embodiments of the present disclosure.
Figure 8:
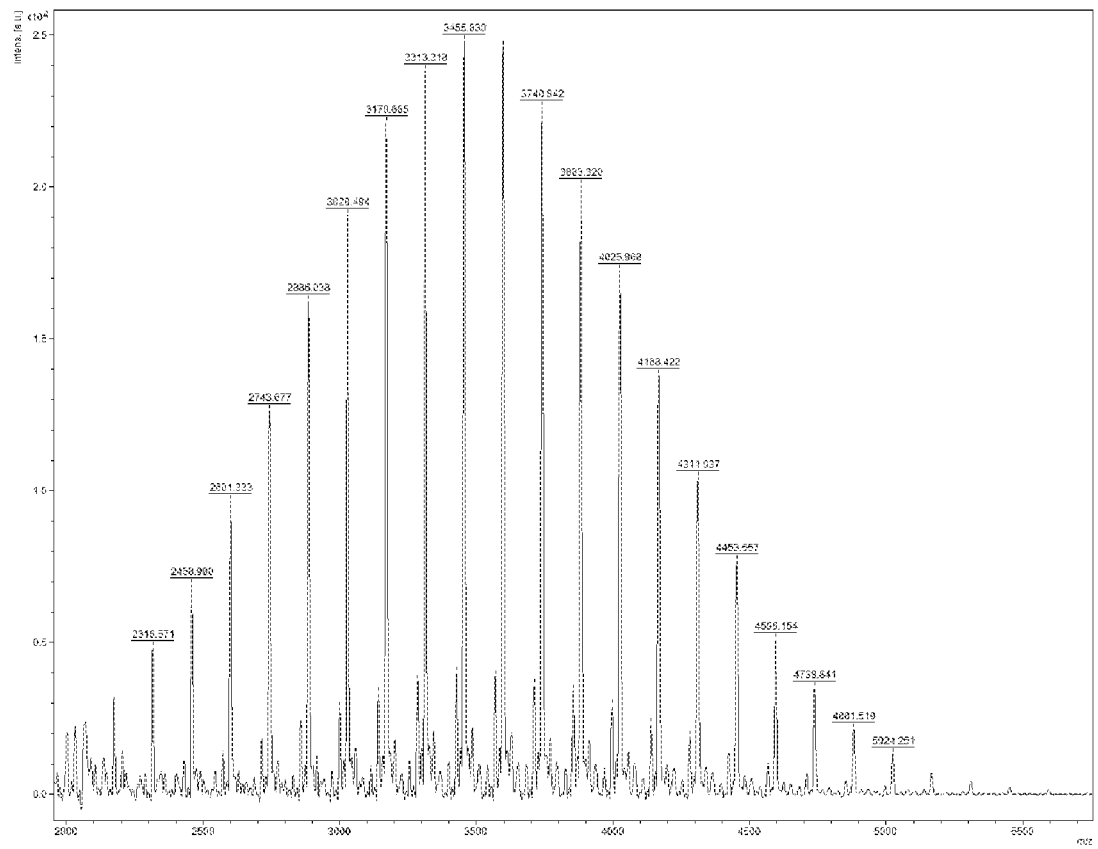
FIG. 8 is a graphical view of representative MALDI-TOF data of poly(glycidyl azide) from Table 1, Entry 5 (PPNCl as initiator), according to one or more embodiments of the present disclosure.
Figure 9:
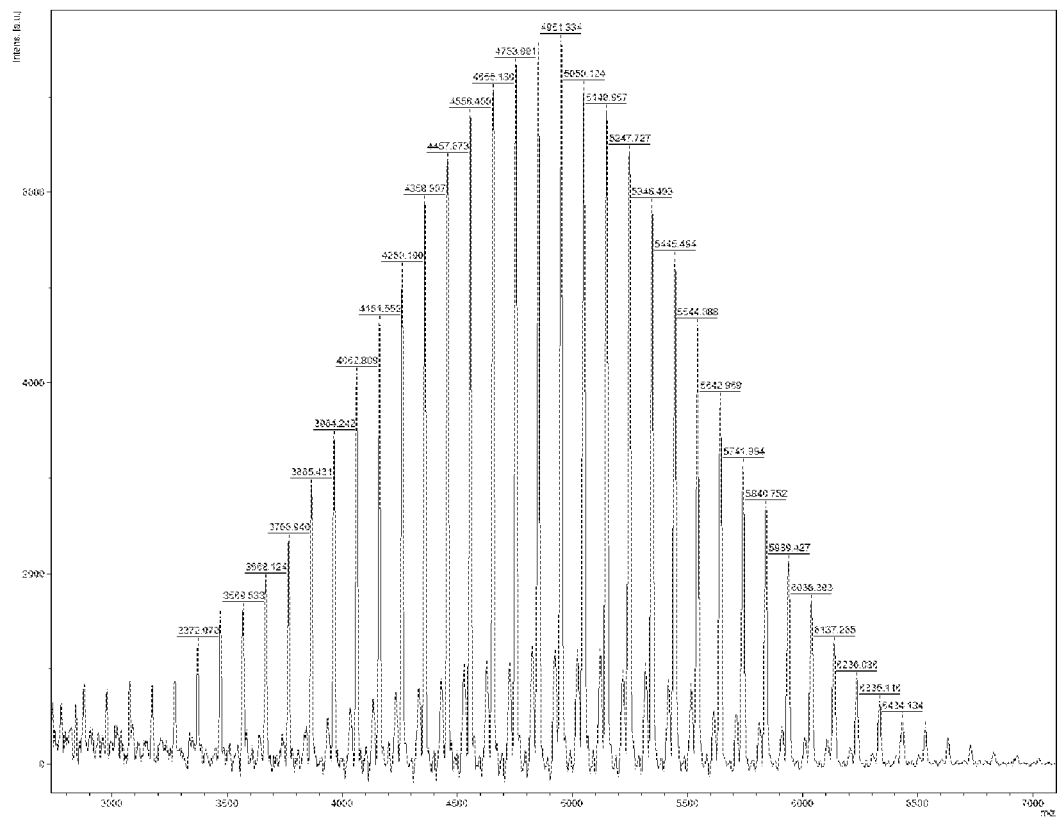
FIG. 9 is a graphical view of representative MALDI-TOF data of poly(glycidyl azide) from Table 1, Entry 8 ($Oct_4NBr$ as initiator), according to one or more embodiments of the present disclosure.
Figure 10:
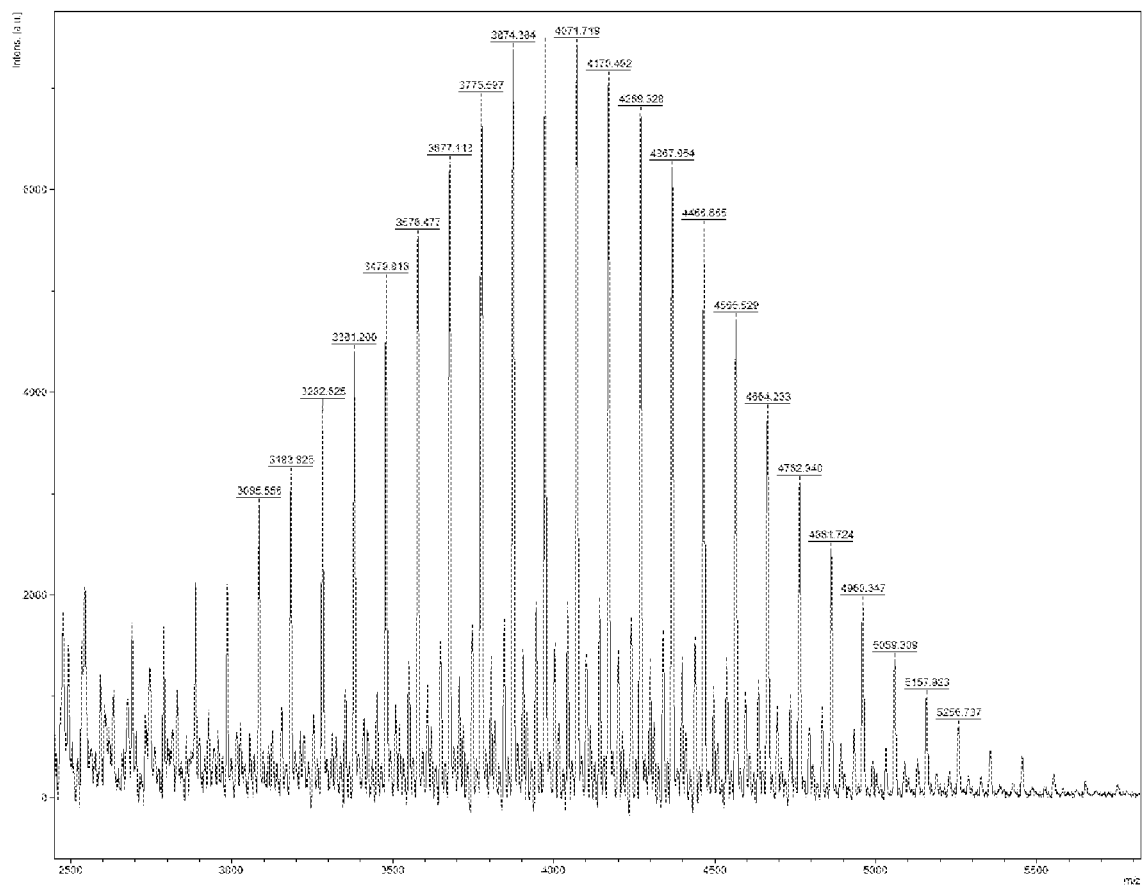
FIG. 10 is a graphical view of representative MALDI-TOF data of poly(glycidyl azide) from Table 1, Entry 15 (ROH—$P_4$ as initiator), according to one or more embodiments of the present disclosure.
Figure 11:
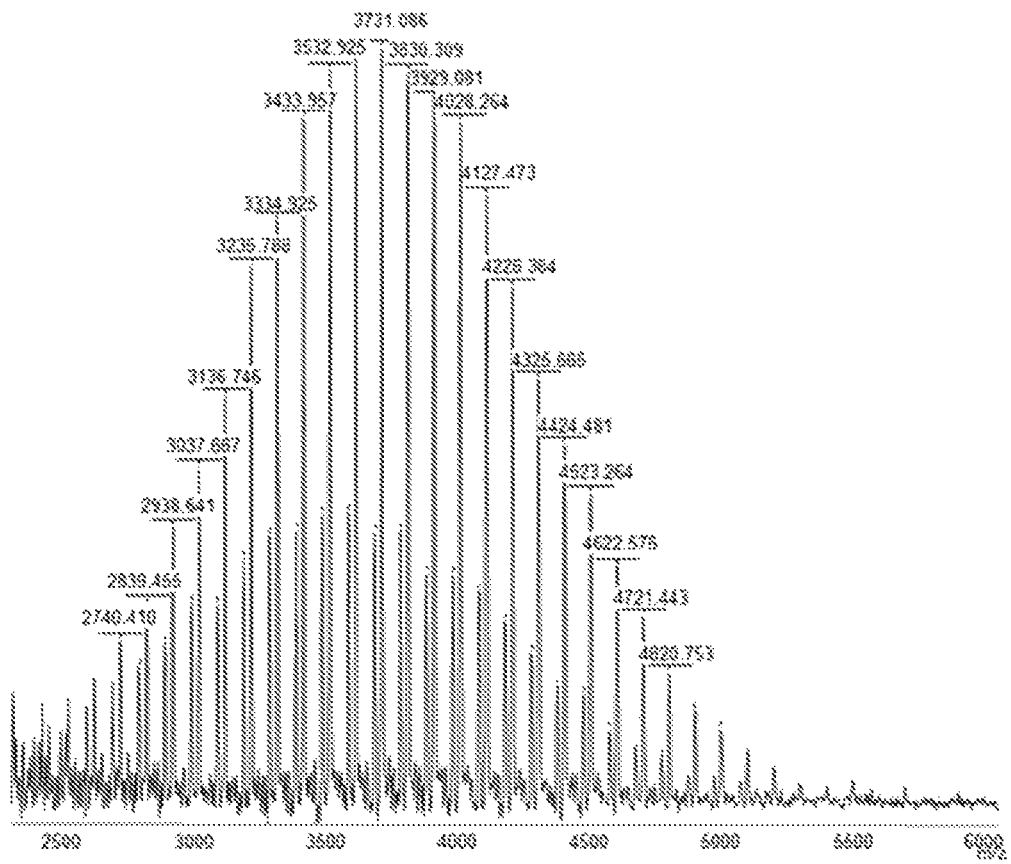
FIG. 11 is a graphical view of representative MALDI-TOF data of poly(glycidyl azide) from Table 1, Entry 19 (($NOct)_2$ADP as initiator), according to one or more embodiments of the present disclosure.
Figure 12:
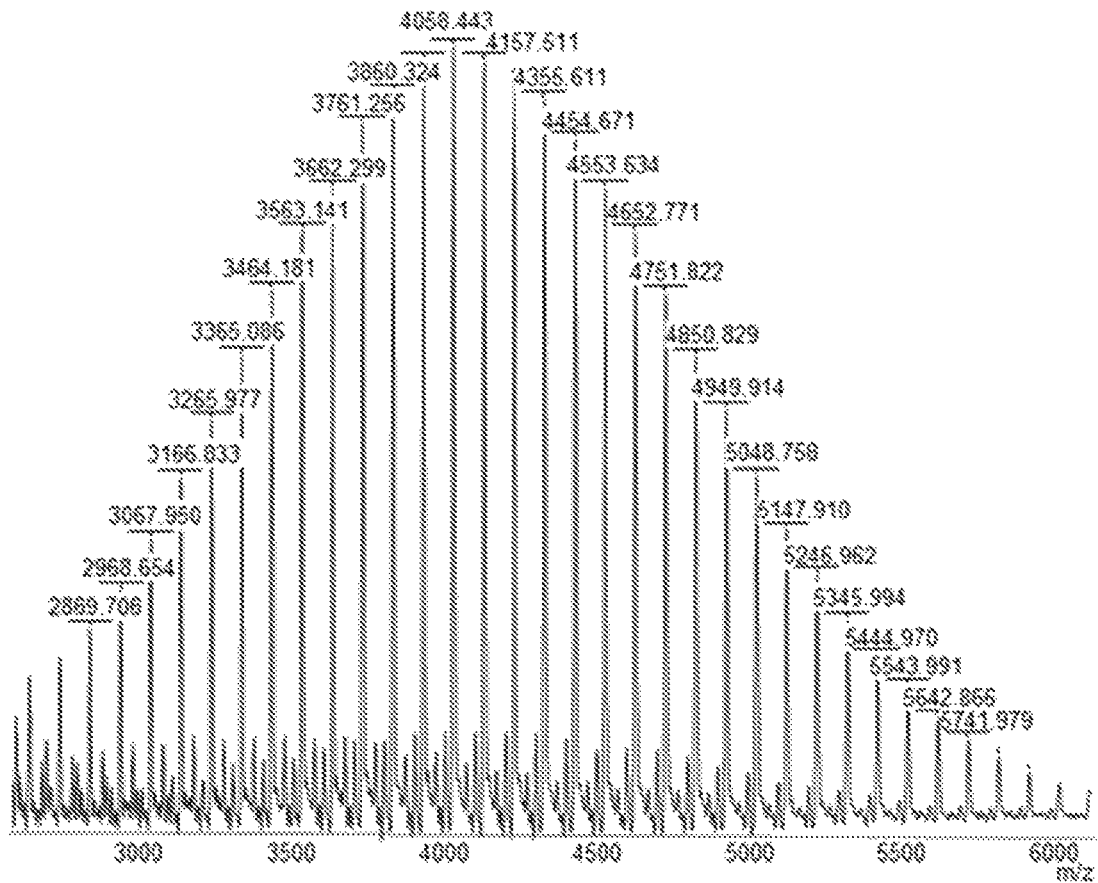
FIG. 12 is a graphical view of representative MALDI-TOF data of poly(glycidyl azide) from Table 1, Entry 20 (($NOct)_3$TCA as initiator), according to one or more embodiments of the present disclosure.
Figure 13:
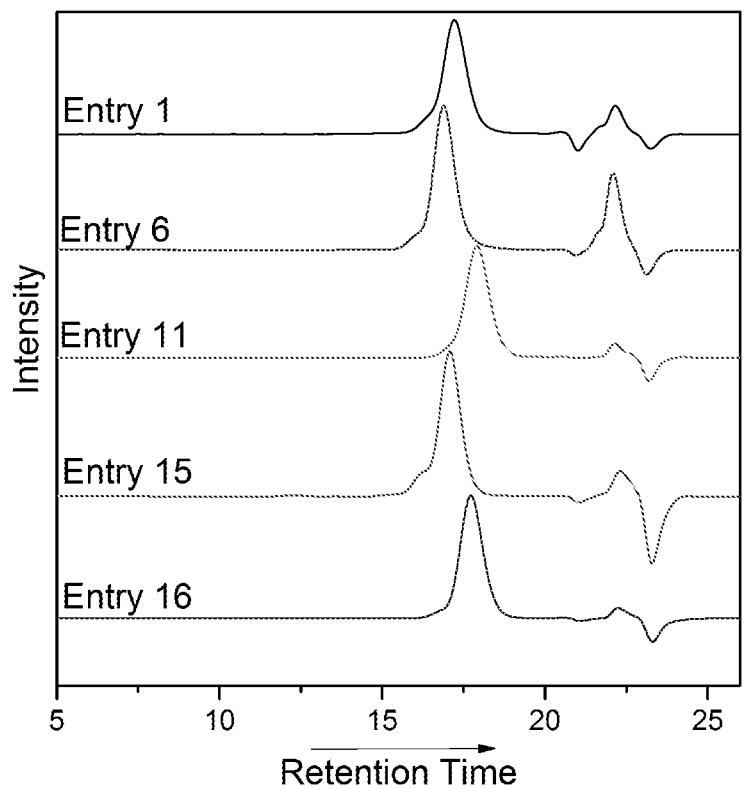
FIG. 13 is a graphical view of representative GPC traces of poly(glycidyl azide) carbonate from Table 2, according to one or more embodiments of the present disclosure.
Figure 14:
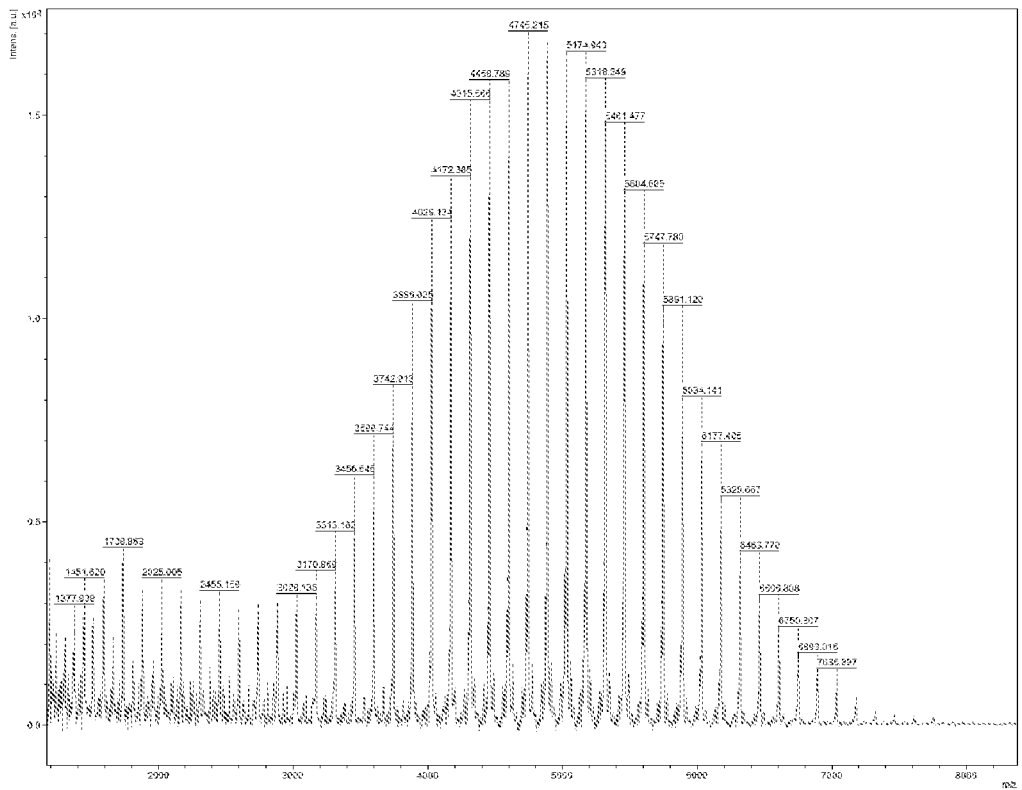
FIG. 14 is a graphical view of representative MALDI-TOF data of poly(glycidyl azide) carbonate from Table 2, Entry 15 ($Bu_4NN_3$ as initiator at −5° C. for DP=100), according to one or more embodiments of the present disclosure.
Figure 15:
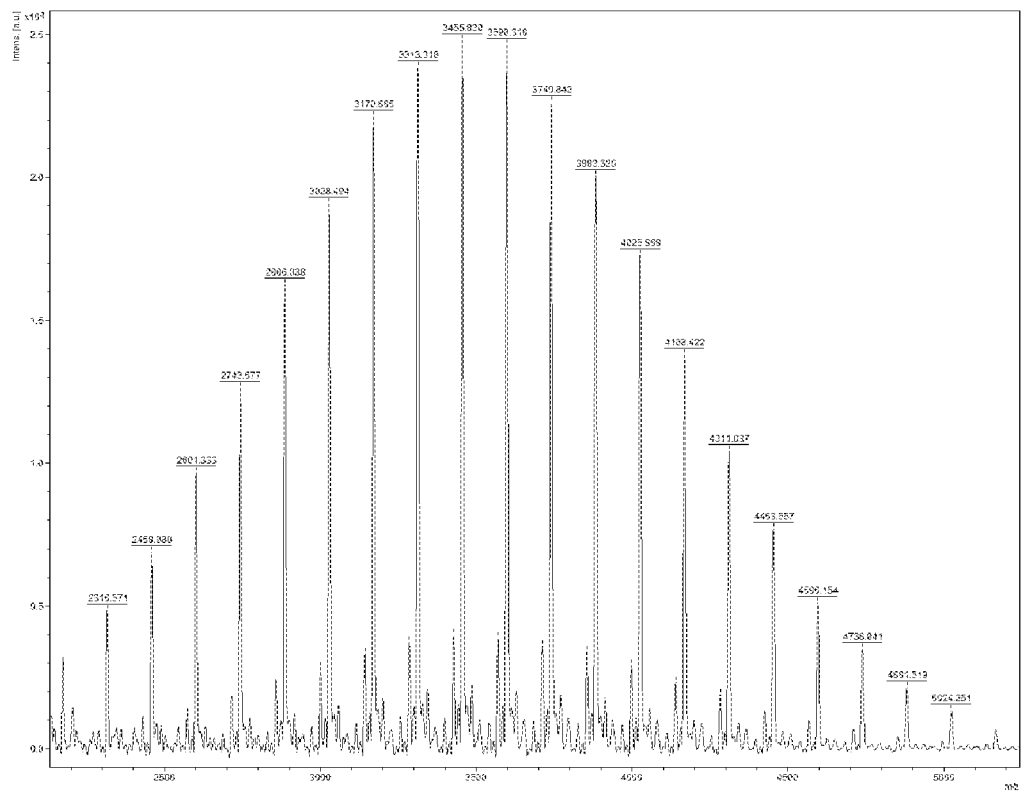
FIG. 15 is a graphical view of representative MALDI-TOF data of poly(glycidyl azide) carbonate from Table 2, Entry 16 ($Bu_4NN_3$ as initiator at −5° C. for DP=100), according to one or more embodiments of the present disclosure.
Figure 16:
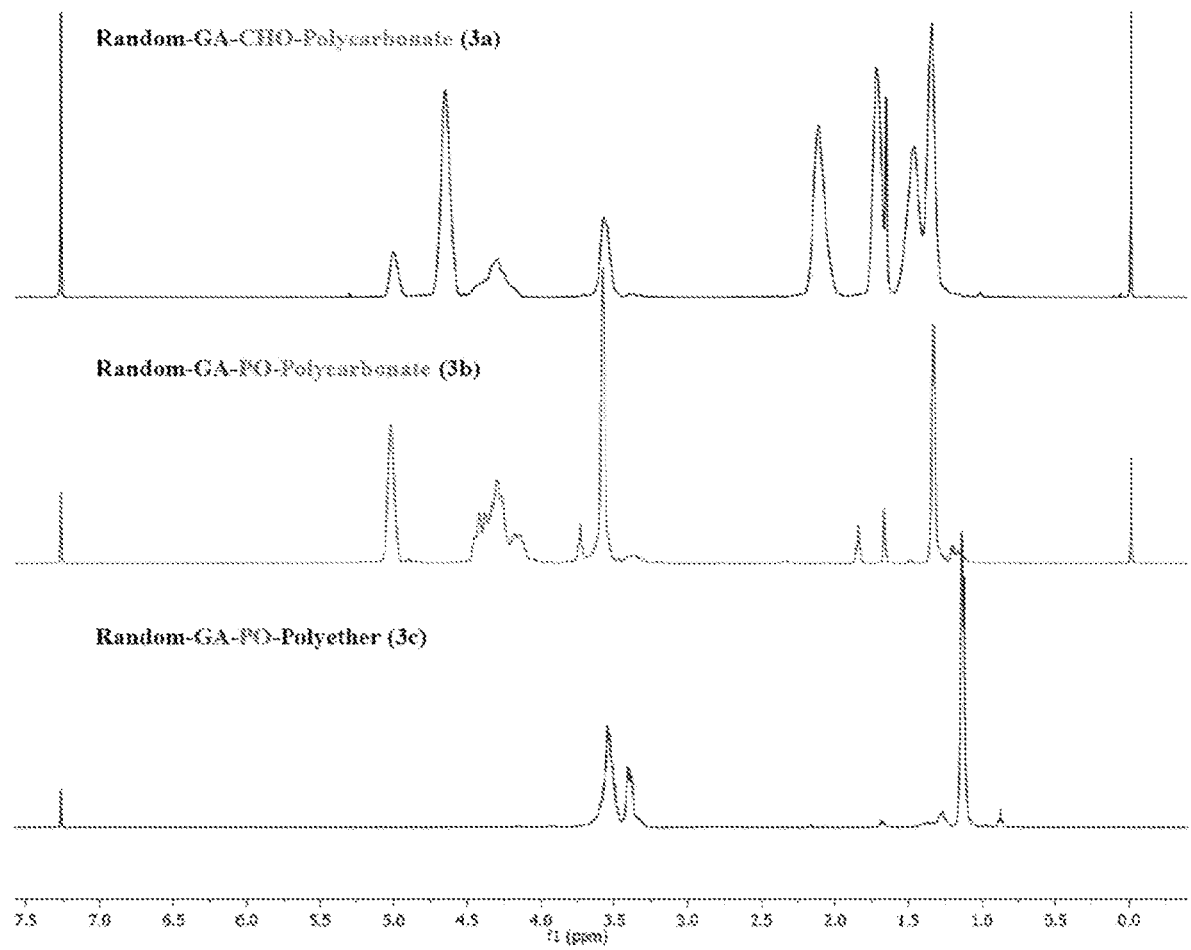
FIG. 16 is $^1$H NMR spectra of 3a, 3b, and 3c (Scheme 1, Table 3), according to one or more embodiments of the present disclosure.

FIG. 5 is a method 500 of synthesizing a glycidyl azide random polycarbonate copolymer 510, according to one or more embodiments of the present disclosure. The method 500 comprises contacting 504 a glycidyl azide monomer, an epoxide monomer, an initiator, and a Lewis acid in a reaction medium 502, and charging 508 the reaction medium with carbon dioxide 506 to form a glycidyl azide random polycarbonate copolymer 510. In an embodiment, the glycidyl azide random polycarbonate copolymer is formed from the terpolymerization of glycidyl azide monomer, epoxide monomer, and carbon dioxide. The glycidyl azide copolymer may be characterized by the following formula:

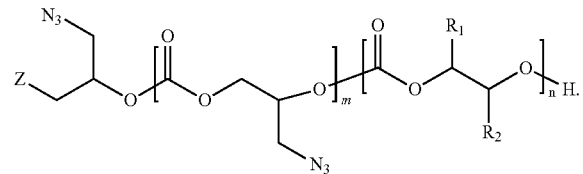

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

Synthesis of Glycidyl Azide

Procedure for the synthesis of glycidyl azide: Epichlorohydrin (40.0 mL, 510 mmol) was added to a solution of sodium azide (40.0 g, 610 mmol) and acetic acid (35 mL, 610 mmol) in 25% (v/v) ethanol/water (200 mL). The biphasic mixture was stirred vigorously at room temperature for 24 h. Brine (250 mL) was added and the mixture was extracted with EtOAc (3×400 mL). The combined extracts were dried over $Na_2SO_4$ and concentrated in vacuo to provide 1-azido-3-chloropropan-2-ol as a colorless oil (67 g, 97% yield). An aqueous solution of 1N sodium hydroxide (550 mL, 550 mmol) was added to 1-azido-3-chloropropan-2-ol with stirring on a RT $H_2O$ bath. Stirring was continued for 2 h after the addition. The suspension was then extracted with $CH_2Cl_2$ (3×300 mL). The combined extracts were washed with brine (200 mL) and dried over $Na_2SO_4$. Concentration in vacuo provided glycidyl azide (40.0 g, 83% yield) as a colorless mobile oil. The obtained monomer was stirred with 2 g of calcium hydride at 40° C. for 3 days and distilled under static vacuum to get the pure monomer with spectral data in agreement with those previously reported. $^1$H NMR (400 MHz, $CDCl_3$, 25° C.): δ 3.56 (dd, J=13.8, 3.2 Hz, 1H), 3.31 (dd, J=13.5, 5.4 Hz, 1H), 3.19 (m, 1H), 2.84 (dd, J=4.7, 4.1 Hz, 1H), 2.71 (dd, J=4.8, 2.5 Hz, 1H).

Example 2

Homopolymerization of Glycidyl Azide

Representative procedure for triethyl borane (TEB) catalyzed homopolymerization of glycidyl azide (eg. entry 8, Table 1): A pre-dried 20 mL glass schlenk tube composed of rotaflo stopcock and fitted with magnetic stirring bar was used to carry out this reaction. 55 mg of tetraoctylammonium bromide [$(Oct)_4NBr$, 0.1 mmol] was dissolved in 1.0 g (10 mmol) of glycidyl azide in a 5 mL glass vial inside the glove box and then the whole solution is transferred to the glass schlenk tube under argon condition. The rotaflo was screwed tightly and 300 μL of triethyl borane (TEB, 1M in hexane) was taken in the head space of the schlenk tube and the outlet is closed with a glass stopper. The glass schlenk tube was taken out from the glove box and stirred at 0° C. for 10 minutes. Then the rotaflo was gently opened in order to add TEB with the monomer solution. The reaction mixture was stirred at the same temperature for 20 h, the reaction mixture was quenched with few drops of 5% HCl in water. The quenched mixture was dissolved in $CHCl_3$ (1 mL) and aliquot was taken for NMR and GPC analysis to determine the conversion and molecular weight. The crude mixture was precipitated in methanol and obtained glycidyl azide polyether was characterized MALDI-TOF. The results were listed in Table 1 Entry 8.

Example 3

Glycidyl Azide and $CO_2$ Copolymerization

Representative procedure for triethyl borane catalyzed glycidyl azide and $CO_2$ copolymerization: A 50 mL Parr reactor with magnetic stirrer and a small glass vial inside was first dried in an oven at 120° C. overnight, then immediately placed into the glove box chamber. After keeping under vacuum for 2-3 hours, the reaction vessel was moved into the glove box with argon atmosphere. The autoclave was cooled down to −30° C. using the freezer inside the glove box for 1 hour. The copolymerization of $CO_2$ with glycidyl azide described below is taken from entry 7 in Table 2 as an example. Tetrabutylammonium azide ($NBu_4N_3$, 28 mg, 0.1 mmol) was firstly added into the precooled autoclave and dissolved carefully in 1.0 g of glycidyl azide. Triethyl borane (1M in hexane, 200 μL, 0.2 mmol mL) was added into the monomer solution. The autoclave was sealed and taken out from the glove box and charged with $CO_2$ under a pressure of 20 bar. The copolymerization was carried out at 25° C. for 14 hr. At the end of the polymerization, the unreacted $CO_2$ was slowly released, and the solution was quenched with HCl in methanol (1 mol/L). The crude product was dissolved with $CHCl_3$ and then precipitated in cold methanol. The results were listed in Table 2 entry 6.

Example 4

Glycidyl Azide, Cyclohexene Oxide, and $CO_2$ Terpolymerization

Representative procedure for triethyl borane catalyzed glycidyl azide, CHO and $CO_2$ terpolymerization (3a): Tetrabutylammonium azide (NBu$_4$N$_3$, 28 mg, 0.1 mmol) was firstly added into the precooled autoclave and dissolved carefully in 0.20 g of glycidyl azide (2 mmol). To that mixture was added 0.81 g (4 mmol) of cyclohexene oxide. Then, triethyl borane (1M in hexane, 100 µL, 0.1 mmol) was added into the monomer solution. The autoclave was sealed and taken out from the glove box and charged with CO$_2$ under a pressure of 20 bar. The copolymerization was carried out at 25° C. for 14 hr. At the end of the polymerization, the unreacted CO$_2$ was slowly released, and the solution was quenched with HCl in methanol (1 mol/L). The crude product was dissolved with CHCl$_3$ and then precipitated in cold methanol. The results were listed in Table 3 entry 1.

Example 5

Glycidyl Azide, Propylene Oxide, and CO$_2$ Terpolymerization

Representative procedure for triethyl borane catalyzed glycidyl azide, PO and CO$_2$ terpolymerization (3b). Tetrabutylammonium azide (NBu$_4$N$_3$, 55 mg, 0.2 mmol) was firstly added into the precooled autoclave and dissolved carefully in 0.93 g of propylene oxide (16 mmol). To that mixture was added 0.40 g (4 mmol) of Glycidyl azide. Then, triethyl borane (1M in hexane, 200 µL, 0.2 mmol) was added into the monomer solution. The autoclave was sealed and taken out from the glove box and charged with CO$_2$ under a pressure of 20 bar. The copolymerization was carried out at 25° C. for 14 hr. At the end of the polymerization, the unreacted CO$_2$ was slowly released, and the solution was quenched with HCl in methanol (1 mol/L). The crude product was dissolved with CHCl$_3$ and then precipitated in cold methanol. The results were listed in Table 3 entry 2.

Example 6

Glycidyl Azide and CO$_2$ Random Copolymerization

Representative procedure for triethyl borane catalyzed glycidyl azide and PO random copolymerization (3c): A pre-dried 20 mL glass schlenk tube composed of rotaflo stopcock and fitted with magnetic stirring bar was used to carry out this reaction. 41 mg of tetraoctylammonium bromide [(Oct)$_4$NBr, 0.075 mmol] was dissolved in 0.38 g (6.75 mmol) of propylene oxide and 0.074 g (0.75 mmol) of glycidyl azide of in a 5 mL glass vial inside the glove box and then the whole solution is transferred to the glass schlenk tube under argon condition. The rotaflo was screwed tightly and 375 µL of triethyl borane (TEB, 1M in hexane) was taken in the head space of the schlenk tube and the outlet is closed with a glass stopper. The glass schlenk tube was taken out from the glove box and stirred at 0° C. for 10 minutes. Then the rotaflo was gently opened in order to add TEB with the monomer solution. The reaction mixture was stirred at the same temperature for 20 h, the reaction mixture was quenched with few drops of 5% HCl in water. The quenched mixture was dissolved in CHCl$_3$ (1 mL) and aliquot was taken for NMR and GPC analysis to determine the conversion and molecular weight. The results are displayed in Table 3, entry 3.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of synthesizing a glycidyl azide homopolymer, comprising:
   contacting a glycidyl azide monomer, an initiator, and a Lewis acid sufficient to form the glycidyl azide homopolymer;
   wherein the glycidyl azide homopolymer is directly polymerized by anionic ring-opening polymerization of the glycidyl azide monomer;
   and wherein the initiator is characterized by the formula Y$^+$Z$^-$; where Y$^+$ is an onium salt including any alkyl group and Z$^-$ is selected from the group consisting of a halide anion, pseudohalide, alkoxide, phenoxide, carboxylate, carbonate, hydrogen carbonate and combinations thereof.

2. The method of claim 1, wherein Z$^-$ is Cl$^-$, Br$^-$, N$_3^-$, RO$^-$, ROCO$_2^-$, or RCO$_2^-$ and Y$^+$ is t-BuP$_4$H$^+$, NBu$_4^+$, PPN$^+$, PPh$_4^+$, or PBu$_4^+$, wherein R is an alkyl group.

3. A method of synthesizing a glycidyl azide homopolymer, comprising:
contacting a glycidyl azide monomer, an initiator, and a Lewis acid sufficient to form the glycidyl azide homopolymer;
wherein the glycidyl azide homopolymer is directly polymerized by anionic ring-opening polymerization of the glycidyl azide monomer; and
wherein the initiator is one or more of $Bu_4NBr$, $Bu_4NCl$, $Bu_4NN_3$, PPNCl, $Bu_4PCl$, tetraocylammonium bromide (($Oct)_4NBr$), ROH—$P_4$, HOROH—$P_4$, $Bu_4NCO_2H$, BuLi—$P_4$, ditetraoctylammonium adipate (($NOct)_2ADP$), and tetraocylammonium tricarballylate (($NOct)_3TCA$), wherein R is an alkyl group.

4. A method of synthesizing a glycidyl azide homopolymer, comprising:
contacting a glycidyl azide monomer, an initiator, and a Lewis acid sufficient to form the glycidyl azide homopolymer;
wherein the glycidyl azide homopolymer is directly polymerized by anionic ring-opening polymerization of the glycidyl azide monomer; and
wherein the Lewis acid is an alkyl borane, an alkyl aluminum, or an ester form thereof.

5. The method of claim 4, wherein the Lewis acid is a trialkyl borane, a trialkyl aluminum, or an ester form thereof.

6. The method of claim 1, wherein the initiator and the Lewis acid are present at a molar ratio within a range of 1:1 to 1:10.

7. The method of claim 1, wherein the Lewis acid is provided in molar excess of the initiator.

8. The method of claim 1, wherein $Z^-$ forms a first end group of the glycidyl azide homopolymer; and wherein —OH forms a second end group of the glycidyl azide homopolymer.

9. The method of claim 5, wherein the Lewis acid is selected from the group consisting of triethyl borane, trimethyl borane, triisobutylborane, triphenylborane, or ester forms thereof.

10. The method of claim 5, wherein the Lewis acid is triisobutyl aluminum or an ester form thereof.

11. The method of claim 1, wherein the initiator is one or more of $Bu_4NBr$, $Bu_4NCl$, $Bu_4NN_3$, PPNCl, $Bu_4PCl$, tetraocylammonium bromide (($Oct)_4NBr$), ROH—$P_4$, HOROH—$P_4$, $Bu_4NCO_2H$, BuLi-$P_4$, ditetraoctylammonium adipate (($NOct)_2ADP$), and tetraocylammonium tricarballylate (($NOct)_3TCA$), wherein R is an alkyl group.

12. The method of claim 1, wherein the Lewis acid is an alkyl borane, an alkyl aluminum, or an ester form thereof.

13. The method of claim 3, wherein the Lewis acid is an alkyl borane, an alkyl aluminum, or an ester form thereof.

14. The method of claim 4, wherein the initiator is characterized by the formula $Y^+Z^-$; where $Y^+$ is an onium salt including any alkyl group and $Z^-$ is selected from the group consisting of a halide anion, pseudohalide, alkoxide, phenoxide, carboxylate, carbonate, hydrogen carbonate and combinations thereof.

15. The method of claim 4, wherein the initiator is one or more of $Bu_4NBr$, $Bu_4NCl$, $Bu_4NN_3$, PPNCl, $Bu_4PCl$, tetraocylammonium bromide (($Oct)_4NBr$), ROH—$P_4$, HOROH—$P_4$, $Bu_4NCO_2H$, BuLi-$P_4$, ditetraoctylammonium adipate (($NOct)_2ADP$), and tetraocylammonium tricarballylate (($NOct)_3TCA$), wherein R is an alkyl group.

\* \* \* \* \*